Aug. 23, 1927.  
T. V. BUCKWALTER  
1,640,180  
RAILWAY CAR TRUCK  
Filed June 3, 1926 2 Sheets-Sheet 1
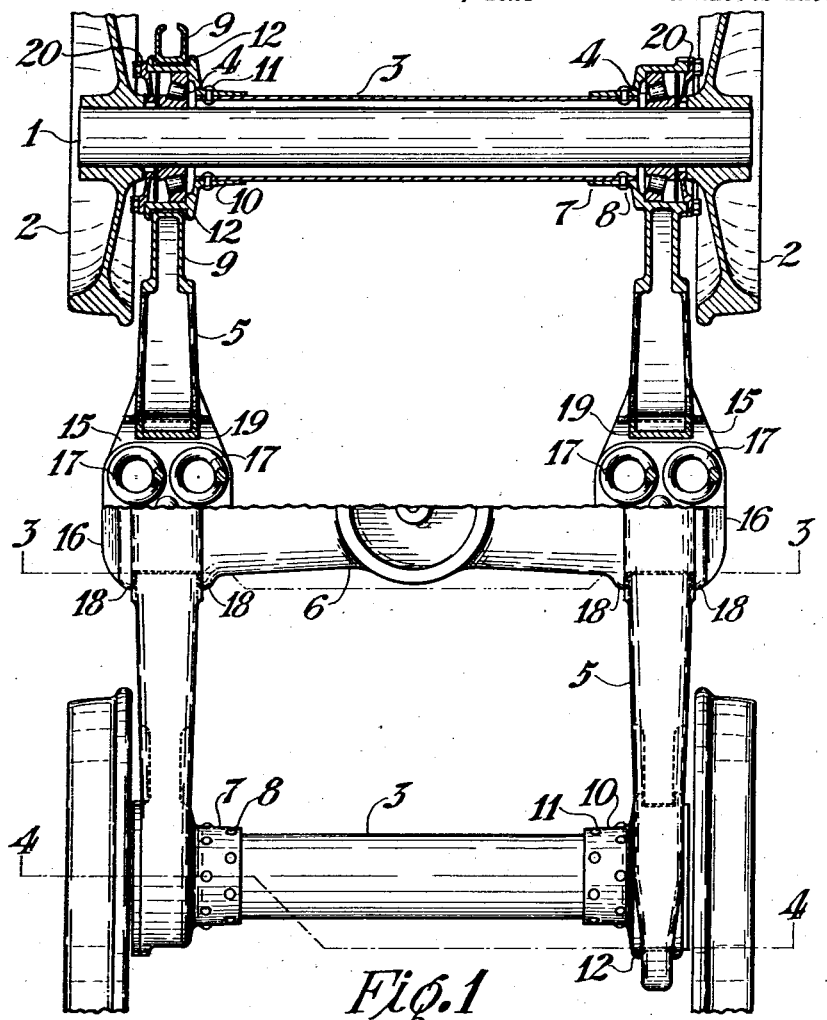
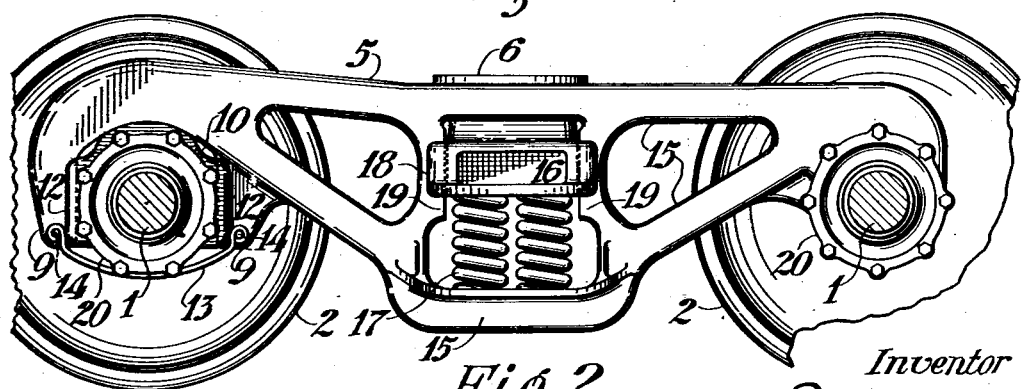
Inventor  
Tracy V. Buckwalter  
by Carothers  
His Attorneys.

Patented Aug. 23, 1927.

1,640,180

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

RAILWAY-CAR TRUCK.

Application filed June 3, 1926. Serial No. 113,405.

My invention relates to railway car trucks and has for its principal objects to provide for maintaining parallelism of the axles and alinement of the car wheels and to dispense with the spring plank heretofore used in such trucks.

The invention consists principally in rigidly securing one end of each truck side frame to the end of an axle housing in which the axle is mounted and in providing the other end of each truck side frame with jaws adapted to fit over the end of an axle housing, the rigid corners of the assembled truck being diagonally opposite each other. The invention further consists in disposing the supporting springs between the ends of the bolster and a portion of the truck side frames, thereby eliminating the spring plank ordinarily used. The invention further consists in the railway car truck and in the parts and combinations of parts hereinafter described and claimed.

Figure 3:
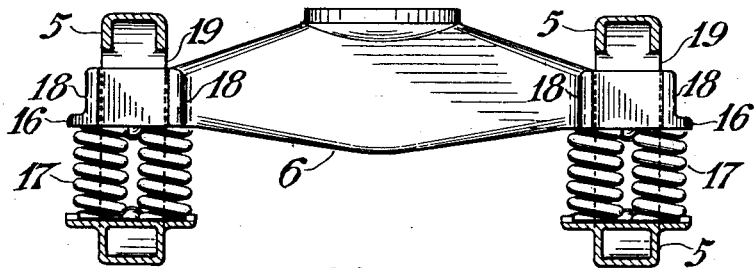
Figure 4:
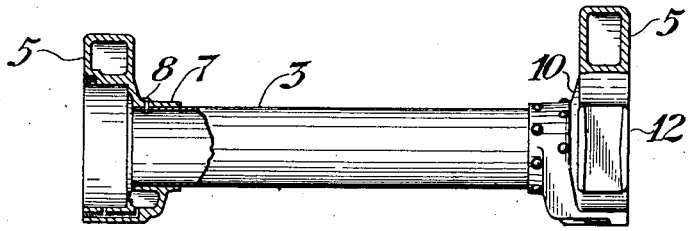
Figure 5:
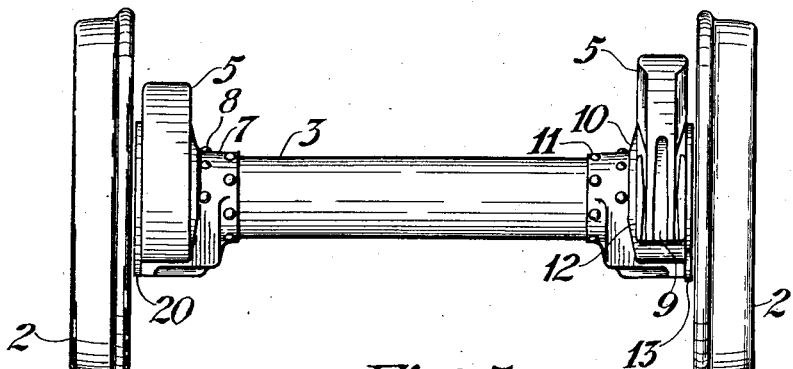

In the accompanying drawing, wherein like reference characters indicate like parts wherever they occur, Fig. 1 is a part plan view, part horizontal sectional view of a railway car truck embodying my invention, Fig. 2 is a side elevation thereof, one pair of wheels being removed, Fig. 3 is a view on the line 3—3 of Fig. 1, the wheels being omitted, Fig. 4 is a view on the line 4—4 of Fig. 1, the wheels being omitted, and Fig. 5 is an end view.

The car truck shown in the accompanying drawing comprises axles 1 having flanged wheels 2 fixed thereon, axle housings 3 enclosing said axles (conical roller bearings 4 being preferably interposed between the axles 1 and the ends of the axle housings 3), truck side frames 5 connecting the axle housings 3 and a bolster 6 extending across the middle of the truck from side frame to side frame.

One end of each side frame 5 is provided with a tubular portion 7 projecting transversely therefrom. One end portion of an axle housing 3 extends into said tubular portion 7 of the side frame 5 and is rigidly fixed therein, as by means of rivets 8. The other end of each side frame is provided with jaws 9 adapted to fit over the end portion of an axle housing. In the drawing is shown a separate member 10 rigidly mounted on the end of the housing, as by means of rivets 11. The upper surface of the member 10 is preferably rounded off and the lower surface of the truck side frame between the jaws is correspondingly rounded. The inner faces of the jaws and the sides of the member 10 are preferably flat.

When the truck is assembled, the rigid corners thereof (that is, the corners where the truck side frame is rigidly secured to the end of the axle housing) are diagonally opposite; and the loose corners (that is, those where the truck side frames are provided with jaws fitting over the ends of the axle housings) are diagonally opposite.

The portions 10 of the axle housings over which the jaws 9 of the side frames fit have projecting rib members 12 on their sides engaging the sides of the jaws 9 of the side frames; whereby relative vertical movement of the axles and housings with respect to the side frames is permitted but movement in other directions is prevented. Preferably said ribs 12 are inclined from their ends toward their middle portions, that is, the space between ribs is least at the middle and increases toward the top and bottom, thereby accommodating the slight swinging movement of the axle as it is raised or lowered with respect to the side frame. This vertical movement is limited and the parts held in assembly by a resilient fastening clip 13 passing under the end of each housing and secured at its ends to the side frame jaws, as by pins 14.

Each side frame is provided with an open middle portion between the upper and lower arch bars 15 into which extends one end 16 of the bolster 6, said bolster constituting the support for the car body (not shown in the drawing). Springs 17 are interposed between the bolster and the lower bar 15 of the side frame. The bolster end 16 is preferably provided with upstanding ribs 18 constituting guide-ways in which are disposed the vertical guide bars 19 of the truck side frames, whereby vertical movement of the bolster is permitted but movement in other directions is prevented. Preferably the ends of the axle housings 3 are closed by suitable rings 20 whereby dirt is excluded from the bearings and lubricant retained therein. Suitable brakes and brake rigging and other common features of car construction are mounted on the truck in practice; but since these features are immaterial to the present invention, they are not shown in the drawing.

The axles of the above described car truck are always maintained parallel and the wheels are kept in perfect alinement. In passing over rough or uneven tracks, the wheels are free to yield slightly as required, but such yielding is not at the expense of parallelism of the axles. The spring plank usually required to tie the side frames together may be dispensed with. Obviously, the structure is strong and rigid; yet it is simple in construction and economical by reason of the elimination of parts ordinarily required.

Obviously, numerous changes may be made without departing from the invention and I do not wish to be limited to the precise construction shown.

What I claim is:

1. A railway car truck comprising a pair of axle members and a pair of side frames having their ends mounted on the ends of said axle members, each of said side frames being rigidly secured to one of said axle members, said rigid connections being at diagonally opposite corners of the truck, and said axle members being movably received in the end portions of the side frames at the other diagonal corners.

2. A railway car truck comprising a pair of side frames, a pair of axle members having their end portions connected with the end portions of said side frames, each side frame being rigidly connected to one axle member, said rigid connections being at diagonally opposite corners of the truck and the side frames and axle housings being loosely connected at the other diagonally opposite corners, said side frames having upper and lower members at their middles, a bolster extending at its ends into the space between said upper and lower members of said side frames, and springs interposed between said bolster and said lower members of said side frames.

3. A car truck comprising a pair of axle housings and a pair of side frames, said side frames each having a transversely projecting member in which an end of one of said axle housings is rigidly secured, said rigid connections being at diagonally opposite corners of the truck, and the other end of each of said side frames being provided with jaw members, the corresponding end of each housing having an end portion over which said jaws fit.

4. A car truck comprising a pair of axle housings and a pair of side frames, said side frames each having a transversely projecting member in which an end of one of said axle housings is rigidly secured, said rigid connections being at diagonally opposite corners of the truck, the other end of each of said side frames being provided with jaw members, the corresponding end of each housing having an end portion over which said jaws fit, and ribs on said end portions of said axle housings engaging the sides of said jaw members.

5. A car truck comprising a pair of axle housings and a pair of side frames, said side frames each having a transversely projecting member in which an end of one of said axle housings is rigidly secured, said rigid connections being at diagonally opposite corners of the truck, the other end of each of said side frames being provided with jaw members, the corresponding end of each housing having an end portion over which said jaws fit, and ribs on said end portions of said axle housings engaging the sides of said jaw members, the distance between said ribs being least at the middle and increasing toward the top and bottom, the middle portions of said ribs contacting with the sides of said jaws.

6. In a car truck construction, an axle housing and a side frame having one end portion fixed to one end portion of said housing and having its other end portion adapted for a loose connection with another axle housing.

7. In a car truck construction, an axle housing and a side frame having one end portion fixed to one end portion of said housing and having its other end portion provided with jaws adapted to fit over the end of an axle housing.

Signed at Canton, Ohio, this 26th day of May, 1926.

TRACY V. BUCKWALTER.